United States Patent
Thomsen et al.

(10) Patent No.: US 12,345,234 B2
(45) Date of Patent: Jul. 1, 2025

(54) METHOD FOR DECREASING BLADE DEFLECTION DURING TOWER PASSAGE IN A WIND TURBINE

(71) Applicant: VESTAS WIND SYSTEMS A/S, Aarhus (DK)

(72) Inventors: Jesper Sandberg Thomsen, Hadsten (DK); Anders Druedahl Thurlow, Silkeborg (DK); Alexander Duncan Giles, Oporto (PT); Yi Han, Hasselager (DK)

(*) Notice: Subject to any disclaimer, the term of this patent is extended or adjusted under 35 U.S.C. 154(b) by 0 days.

(21) Appl. No.: 18/720,215

(22) PCT Filed: Dec. 14, 2022

(86) PCT No.: PCT/DK2022/050283
§ 371 (c)(1),
(2) Date: Jun. 14, 2024

(87) PCT Pub. No.: WO2023/110047
PCT Pub. Date: Jun. 22, 2023

(65) Prior Publication Data
US 2025/0059949 A1 Feb. 20, 2025

(30) Foreign Application Priority Data
Dec. 16, 2021 (DK) .............................. PA202170628

(51) Int. Cl.
*F03D 7/02* (2006.01)

(52) U.S. Cl.
CPC ......... *F03D 7/0224* (2013.01); *F03D 7/0288* (2013.01); *F05B 2270/17* (2013.01); *F05B 2270/328* (2013.01); *F05B 2270/33* (2013.01)

(58) Field of Classification Search
CPC .. F03D 7/0224; F03D 7/0288; F05B 2270/17; F05B 2270/33
See application file for complete search history.

(56) References Cited

U.S. PATENT DOCUMENTS 9,567,978 B2 * 2/2017 Marwaha ................ F03D 7/046
9,909,563 B2 * 3/2018 Cook ...................... F03D 7/047
(Continued)

FOREIGN PATENT DOCUMENTS

EP    2726735 A2    5/2014
EP    3199805 A1    8/2017
(Continued)

OTHER PUBLICATIONS

Danish Patent and Trademark Office, 1st Technical Examination including The Search Report and Opinion for Application PA 2021 70628 dated Jun. 24, 2022.
(Continued)

*Primary Examiner* — Justin D Seabe
(74) *Attorney, Agent, or Firm* — Patterson + Sheridan, LLP

(57) ABSTRACT

A method for controlling a wind turbine to decrease blade deflection during tower passage is disclosed. A blade flap moment of the wind turbine blades is measured. A blade flap moment of the wind turbine blades and a rotor tilt moment in a situation where the pitch offset has not been added are estimated, based on the measured blade flap moment. In the case that the estimated blade flap moment exceeds a first activation threshold value and the estimated rotor tilt moment exceeds a second activation threshold value, individual pitch angle adjustment of the wind turbine blades is initiated by adding a pitch offset, at azimuth angles within an azimuth adjustment region corresponding to tower passage of the wind turbine blades.

14 Claims, 7 Drawing Sheets

(56) References Cited

U.S. PATENT DOCUMENTS

| | | | |
|---|---|---|---|
| 10,690,117 B2* | 6/2020 | Slot | F03D 7/04 |
| 12,018,653 B2* | 6/2024 | Esbensen | F03D 17/022 |
| 2015/0337803 A1 | 11/2015 | Molins Garralda et al. | |
| 2016/0252075 A1* | 9/2016 | Krüger | F03D 17/00 416/1 |
| 2018/0087488 A1 | 3/2018 | Slot | |
| 2021/0317817 A1 | 10/2021 | Vaddi et al. | |

FOREIGN PATENT DOCUMENTS

| | | |
|---|---|---|
| EP | 3922840 A1 | 12/2021 |
| WO | 2019200526 A1 | 10/2019 |

OTHER PUBLICATIONS

PCT International Search Report and Written Opinion of The International Searching Authority for Application PCT/DK2022/050283 dated Mar. 23, 2023 (Mar. 23, 2023).

* cited by examiner

METHOD FOR DECREASING BLADE DEFLECTION DURING TOWER PASSAGE IN A WIND TURBINE

FIELD OF THE INVENTION

The present invention relates to a method for controlling a wind turbine to decrease blade deflection during tower passage.

BACKGROUND OF THE INVENTION

When operating a horizontal axis wind turbine, each of the wind turbine blades passes the tower of the wind turbine once for each full rotation of the rotor. In the case that the wind turbine is an upwind wind turbine, i.e. a wind turbine in which the rotor is directed towards the incoming wind, the forces acting on the wind turbine blades by the wind push the wind turbine blades towards the tower. This may introduce a risk of collisions between the wind turbine blades and the tower during tower passage.

The risk of collisions between the wind turbine blades and the tower depends, e.g., on how much the wind turbine blades deflect in response to the wind acting on the wind turbine blades. Accordingly, the more flexible the wind turbine blades are, the higher the risk that they deflect to an extent which introduces a risk of collision between the wind turbine blades and the tower.

Various measures have previously been taken in order to ensure a safety distance between the wind turbine blades and the tower during tower passage, sometimes referred to as tower clearance.

For instance, the wind turbine blades may be designed with a stiffness which is sufficiently high to ensure that they are unable to deflect to an extent which may cause collisions with the tower. However, this has the disadvantage that the weight of the wind turbine blades may need to be increased, and that the blades are unable to deflect in situations where this is actually desired in order to avoid loads on the wind turbine blades, and this may cause the wind turbine blades to break.

As an alternative, the rotor may be designed in a manner which positions the blade tips at a distance from the tower during tower passage, which is sufficiently large to prevent collisions between the wind turbine blades and the tower, even if the wind turbine blades deflect. This could, e.g., include introducing a large coning angle, introducing a large overhang of the rotor or hub, or introducing a large rotor tilt angle. However, such rotor designs have the disadvantage that they introduce higher loads on the wind turbine, in particular on the main shaft and the drive train.

As another alternative, the pitch angle of the wind turbine blades may be adjusted cyclically, in such a manner that the wind turbine blades are pitched slightly out of the wind during tower passage. Thereby the deflection of the wind turbine blades is decreased while they pass the tower, but the ability of the wind turbine blades to extract energy from the wind is maintained for most of the rotor plane. However, constant cyclic adjustment of the pitch angle introduces extensive wear in the pitch bearings.

US 2013/0045098 A1 discloses a cyclic pitch control system for a wind turbine. An open loop control algorithm for incrementally or positively adjusting the pitch angle of individual rotor blades may be used to increase spacing between the base of the turbine tower and an approaching blade tip. As each blade approaches the tower base, it may be feathered to reduce its power loading, and to facilitate increased clearance beyond the normal unloading or feathering produced by the so-called tower shadow effect.

DESCRIPTION OF THE INVENTION

It is an object of embodiments of the invention to provide a method for controlling a wind turbine to decrease blade deflection during tower passage, in which wear on the pitch bearings is decreased without introducing a risk of collisions between the wind turbine blades and the tower.

According to a first aspect the invention provides a method for controlling a wind turbine to decrease blade deflection during tower passage, the blade deflection being decreased by adding a pitch offset at azimuth angles within an adjustment region, the wind turbine comprising a tower, a nacelle mounted rotatably on the tower, and one or more pitchable wind turbine blades mounted rotatably on the nacelle via a hub, the wind turbine blades thereby performing azimuth rotations relative to the nacelle, along with the hub, the method comprising the steps of:

measuring a blade flap moment of the wind turbine blades, at least at azimuth angles corresponding to tower passage of the wind turbine blades, estimating a blade flap moment of the wind turbine blades in a situation where the pitch offset has not been added, based on the measured blade flap moment, estimating a rotor tilt moment in a situation where the pitch offset has not been added, based on the measured blade flap moment, comparing the estimated blade flap moment to a first activation threshold value, and comparing the estimated rotor tilt moment to a second activation threshold value, in the case that the estimated blade flap moment exceeds the first activation threshold value and the estimated rotor tilt moment exceeds the second activation threshold value, initiating individual pitch angle adjustment of the wind turbine blades by adding the pitch offset, at azimuth angles within an adjustment region, the adjustment region including an azimuth position corresponding to tower passage of the wind turbine blades.

Thus, the method according to the first aspect of the invention is a method for controlling a wind turbine to decrease blade deflection during tower passage. This is obtained by adding a pitch offset, i.e. an offset to a common pitch angle applied to all of the wind turbine blades, at azimuth angles within an adjustment region.

The wind turbine comprises a tower, a nacelle mounted rotatably on the tower, and one or more pitchable wind turbine blades mounted rotatably on the nacelle via a hub. Thus, when wind acts on the wind turbine blades, they cause rotation of the hub relative to the nacelle, about a main axle. The wind turbine blades rotate along with the hub, and this rotation is referred to as 'azimuth rotation'. The hub and the wind turbine blades are sometimes referred to as the rotor. Thus, each wind turbine blade performs a 360° azimuth rotation for each full turn of the rotor.

In the method according to the invention, a blade flap moment of the wind turbine blades is measured, at least at azimuth angles corresponding to tower passage of the wind turbine blades. In the present context the term 'blade flap moment' should be interpreted to mean a moment on the wind turbine blade along a flapwise direction, i.e. along a direction which is substantially perpendicular to the chord of the wind turbine blade, i.e. substantially along the thickness of the wind turbine blade. The flapwise direction is normally primarily perpendicular to the rotor plane defined by the wind turbine blades. Thus, a blade flap moment of a wind turbine blade which is passing the tower is relevant with respect to deflection of the wind turbine blade in a direction towards the tower, and thereby with respect to estimating the risk of collision between the wind turbine blade and the tower.

The measured blade flap moment is the blade flap moment which is actually occurring in the wind turbine blades, i.e. it represents the actual blade flap moment under the prevailing operating conditions, including the actual pitch angle of the wind turbine blade in question.

The blade flap moment may be measured at all azimuth angles, i.e. during the full turn of the rotor. As an alternative, the blade flap moment may only be measured at azimuth angles which are relevant with respect to tower passage, e.g. in the lower half of the rotor plane, in a region of 120° around the azimuth position where the wind turbine blade passes the tower, or in any other suitable part of the rotor plane, as long as it includes the actual tower passage.

The blade flap moment of the wind turbine blades may vary significantly as a function of azimuth angle, e.g. due to wind shear, i.e. variations in wind speed along a vertical direction. Since it is the blade flap moment of the wind turbine blades in the lower part of the rotor plane which is relevant with regard to evaluating the risk of tower collisions, it may be sufficient to measure the blade flap moment at only some azimuth angles, which include the actual tower passage.

The blade flap moment may, e.g., be measured by measuring strain at the wind turbine blades, using a suitable strain sensor, such as one or more strain gauges or one or more optical fibres.

Next, a blade flap moment of the wind turbine blades in a situation where the pitch offset has not been added, is estimated, based on the measured blade flap moment.

Whereas the measured blade flap moment reflects the actual blade flap moment experienced by the wind turbine blades under the actual operating conditions, including the actual pitch angle of each wind turbine blade, the estimated blade flap moment reflects a blade flap moment which the wind turbine blade would experience at azimuth angles within the adjustment region, if the pitch offset was not added. Thus, the estimated blade flap moment is not necessarily identical to the measured blade flap moment, but is rather an indication of how the wind turbine blade would act if nothing was done, in terms of cyclic or individual pitch control, to decrease blade deflection, and thereby increase tower clearance. However, since the estimated blade flap moment is estimated based on the measured blade flap moment, the actually occurring ambient conditions, such as wind speed, wind direction, wind shear, etc., as well as the common pitch angle of the wind turbine blades, are taken into account when estimating the blade flap moment.

Furthermore, a rotor tilt moment in a situation where the pitch offset has not been added, is estimated, based on the measured blade flap moment.

In the present context the term 'rotor tilt moment' should be interpreted to mean a moment on the rotor which tends to bend the rotor backwards or forwards. In the present context the term 'backwards' should be interpreted to mean a direction which causes the tips of the wind turbine blades in the lower part of the rotor plane to move away from the tower, while the tips of the wind turbine blades in the upper part of the rotor plane move in a direction towards the nacelle. Similarly, in the present context the term 'forwards' should be interpreted to mean a direction which causes the tips of the wind turbine blades in the lower part of the rotor plane to move towards the tower, while the tips of the wind turbine blades in the upper part of the rotor plane move in a direction away from the nacelle. A rotor tilt moment in a backwards direction may be referred to as a negative rotor tilt moment, while a rotor tilt moment in a forwards direction may be referred to as a positive rotor tilt moment.

Thus, the rotor tilt moment is also relevant with regard to the distance between the tower and a wind turbine blade passing the tower, and thereby with respect to estimating a risk of collisions between the wind turbine blades and the tower.

Similarly to the situation described above with respect to the estimated blade flap moment, the estimated rotor tilt moment is not necessarily the actually occurring rotor tilt moment, but rather an estimate for a rotor tilt moment which the rotor would experience if nothing was done, in terms of cyclic or individual pitch control, to decrease blade deflection, i.e. if identical pitch angles were applied to the wind turbine blades.

The step of estimating a blade flap moment and the step of estimating a rotor tilt moment may be performed simultaneously, or one of these steps may be performed before the other.

Next, the estimated blade flap moment is compared to a first activation threshold value, and the estimated rotor tilt moment is compared to a second activation threshold value.

In the case that the estimated blade flap moment exceeds the first activation threshold value and the estimated rotor tilt moment exceeds the second activation threshold value, individual pitch angle adjustment of the wind turbine blades is initiated. This is done by adding the pitch offset to the pitch angles of the wind turbine blades, when the wind turbine blades are at azimuth positions within an adjustment region, the adjustment region including an azimuth position which corresponds to tower passage of the wind turbine blade.

Thus, the pitch angle of the wind turbine blades is controlled in such a manner that, during tower passage, the wind turbine blades are pitched slightly out of the wind, thereby decreasing blade deflection and increasing tower clearance. However, at azimuth positions where there is no risk of collisions between the wind turbine blades and the tower, the pitch angle remains at the angle which provides the optimal power production. Thereby the power production of the wind turbine is maximised while sufficient tower clearance is ensured.

The individual pitch angle adjustment described above is only initiated if it is fulfilled that the estimated blade flap moment exceeds the first activation threshold value as well as that the estimated rotor tilt moment exceeds the second activation threshold value. Accordingly, the individual pitch angle adjustment is only initiated if the estimated blade flap moment as well as the estimated rotor tilt moment is within a region where there is a risk of collisions between the wind turbine blades and the tower. In other words, as long as the estimated blade flap moment and/or the estimated rotor tilt moment is/are within a region where it can be assumed that a sufficient tower clearance is obtained, even if no further actions are taken in terms of individual or cyclic pitch, then the individual pitch angle adjustment is not activated. Thereby the wear on the pitch bearings caused by the individual pitch adjustment is minimised, because the individual pitch adjustment is only activated when it is considered absolutely necessary in order to avoid collisions between the wind turbine blades and the tower.

The adjustment region may be asymmetrical with respect to an azimuth position pointing directly downwards.

According to this embodiment, the individual pitch angle adjustment takes place at azimuth angles which are distributed asymmetrically with respect to the azimuth position pointing directly downwards, and thereby the azimuth position where the wind turbine blade passes the tower. The adjustment region may preferably be asymmetrical with respect to the azimuth position pointing directly downwards in such a manner that a larger portion of the adjustment region is arranged at azimuth position before the azimuth position pointing directly downwards than at azimuth positions after this position.

When blade deflection is adjusted by adjusting the pitch angle of a wind turbine blade, there is a delay from the pitch angle is adjusted and until the resulting change in aerodynamic impact on the wind turbine blades causes a change in blade deflection. Therefore, in order to obtain a maximum change in blade deflection at the azimuth position where the wind turbine blade passes the tower, the adjustment region could advantageously be asymmetrical with respect to the azimuth position pointing directly downwards, in such a manner that the pitch adjustment is initiated early, and faded out shortly after the tower has been passed.

For instance, the adjustment region may include azimuth positions from 30° to 190° relative to an azimuth position pointing directly upwards, such as positions from 40° to 190° relative to the azimuth position pointing directly upwards.

The step of estimating a blade flap moment of the wind turbine blades in a situation where the pitch offset has not been added may comprise modelling a static blade flap moment.

In the present context the term 'static blade flap moment' should be interpreted to mean a blade flap moment which is experienced by all of the wind turbine blades, when the wind turbine blades are arranged at a collective or common pitch angle, i.e. without cyclic or individual pitch adjustment, and independently of the azimuth position of the wind turbine blades. This may be modelled, using an appropriate mathematical model of the wind turbine blades, and based on various parameters which affect the wind turbine blades, e.g. including rotational speed of the rotor, common pitch angle of the wind turbine blades, measured or estimated wind speed, power production, etc.

One way of modelling the static blade flap moment is to apply a blade element momentum (BEM) model. A BEM model combines blade element theory and momentum theory to calculate local forces on the wind turbine blade. A BEM model is suitable for estimating the static (DC) flap moment. Such model may be 'slow', in the sense that only low frequencies are modelled, and thus not able to capture a 'fast' change in loads, e.g. due to a gust. However, such fast changes can be included in the estimated blade flap moment by adding a high pass filtered, i.e. only high frequencies, version of the measured flap moment to the DC value obtained by means of the BEM model.

Thus, according to this embodiment, the estimated blade flap moment may be estimated based on a combination of the modelled static blade flap moment and the measured blade flap moment, and the measured blade flap moment may provide contributions which are dependent on azimuth position of the wind turbine blades.

The step of initiating individual pitch angle adjustment of the wind turbine blades may comprise increasing the pitch angle of wind turbine blades within the adjustment region in accordance with a predefined pitch adjustment curve.

According to this embodiment, the pitch offset is in the form of an increase in the pitch angle, i.e. the wind turbine blades are pitched slightly out of the wind. Furthermore, the increase in pitch angle follows a predefined curve, which ensures that the transition from the common or collective pitch angle to the adjusted pitch angle, i.e. the pitch angle including the pitch offset, is performed in a desired manner, e.g. sufficiently smooth to avoid undesired loads.

The predefined pitch adjustment curve may, e.g., be a sigmoid curve, i.e. a curve which is essentially shaped like an 'S'. Such a curve ensures a smooth transition.

Alternatively, the predefined adjustment curve may be any other suitable kind of curve, such as a sinus curve, a square curve, a triangular curve, etc.

Furthermore, in order to ensure a smooth transition when applying the pitch offset, a rate limiter may be applied to the output pitch offset signal, thereby limiting the rate of change of the pitch angle.

The method may further comprise the step of continuously measuring blade flap moment, estimating blade flap moment and rotor tilt moment, and comparing the estimated blade flap moment and the estimated rotor tilt moment to the first activation threshold value and the second activation threshold value, respectively, and the method may further comprise the step of discontinuing individual pitch angle adjustment of the wind turbine blades in the case that the estimated blade flap moment decreases below the first activation threshold value and/or the estimated rotor tilt moment decreases below the second activation threshold value.

According to this embodiment, in the case that individual pitch adjustment has been activated, in the manner described above, continued measurement of the blade flap moment is performed. Furthermore, estimates of the blade flap moment and the rotor tilt moment are continued to be obtained, based on the measured blade flap moment, and in the manner described above, and these are compared to the first and second activation threshold values, respectively, also in the manner described above. Thus, it is continuously investigated whether or not the conditions for initiating the individual pitch angle adjustment still apply.

As long as the estimated blade flap moment remains above the first activation threshold value and the estimated rotor tilt moment remains above the second activation threshold value, the conditions for initiating the individual pitch angle adjustment still apply, and the individual pitch angle adjustment should therefore remain active. However, in the case the estimated blade flap moment decreases below the first activation threshold value and/or the estimated rotor tilt moment decreases below the second activation threshold value, it may be concluded that the individual pitch angle adjustment is no longer required in order to avoid collisions between the wind turbine blades and the tower.

Therefore, when this is the case, the individual pitch angle adjustment is discontinued, in order to decrease the wear on the pitch bearings.

The method may further comprise the step of high pass filtering the measured blade flap moment prior to estimating the blade flap moment and the rotor tilt moment.

According to this embodiment, a static DC part of the measured blade flap moment is removed before it is applied for estimating the blade flap moment and the rotor tilt moment in a situation where the pitch offset has not been added. Thereby only the part of the measured signal which relates to 'fast' changes, e.g. gusts, is used, and the static part of the estimated blade flap moment and rotor tilt moment may be obtained from model based calculations, e.g. in the manner described above. Accordingly, the static and low frequent part is obtained by means of modelling, and the high frequent part is obtained from the measured blade flap moment.

The step of estimating a blade flap moment and/or the step of estimating a rotor tilt moment may comprise applying an asymmetric filter to the measured blade flap moment.

The step of measuring a blade flap moment may be regarded as sampling of measurements performed successively at the wind turbine blades, as they enter a region of azimuth angles where measurement of the blade flap moment is relevant. There may be structural differences from one wind turbine blade to another, which may give rise to differences in deflection of the wind turbine blades, even when the wind turbine blades are subjected to the same ambient impact and at the same pitch angle. Therefore, when one wind turbine blade enters the measurement region while another wind turbine blade leaves the measurement region, a discontinuity in the measured blade flap moment may occur. In this case an asymmetric filter may be applied in order to smoothen the signal applied for estimating the blade flap moment and the rotor tilt moment.

For instance, the asymmetric filter may be designed in such a manner that if the discontinuity in the measured blade flap moment represents a decrease in measured blade flap moment, then a smooth curve interconnecting the two measuring points is applied, in order to obtain a smooth transition. However, if the discontinuity in the measured blade flap moment represents an increase in measured blade flap moment, then the higher measured blade flap moment is applied immediately, in order to avoid that a too low estimate is obtained, and that the individual pitch angle adjustment is therefore not initiated, even though this would have been appropriate.

According to a second aspect the invention provides a control unit for controlling blade deflection during tower passage in a wind turbine, the control unit comprising:
- an input for receiving a measured blade flap moment of wind turbine blades of the wind turbine,
- a blade flap moment estimating module being adapted to estimate a blade flap moment of the wind turbine blades in a situation where a pitch offset has not been added, based on the measured blade flap moment, a rotor tilt moment estimating module being adapted to estimate a rotor tilt moment in a situation where a pitch offset has not been added, based on the measured blade flap moment,
- a comparing unit being adapted to compare the estimated blade flap moment to a first activation threshold value, and to compare the estimated rotor tilt moment to a second activation threshold value, and
- a control output adapted to provide an activation signal for initiating individual pitch angle adjustment of the wind turbine blades by adding a pitch offset, at azimuth angles within an adjustment region, the adjustment region including an azimuth position corresponding to tower passage of the wind turbine blades, in the case that the estimated blade flap moment exceeds the first activation threshold value and the estimated rotor tilt moment exceeds the second activation threshold value.

The control unit according to the second aspect of the invention is, thus, adapted to perform the method according to the first aspect of the invention, and the remarks set forth above are therefore equally applicable here.

According to a third aspect the invention provides a wind turbine comprising a tower, a nacelle mounted rotatably on the tower, and one or more pitchable wind turbine blades mounted rotatably on the nacelle via a hub, the wind turbine blades thereby performing azimuth rotations relative to the nacelle, along with the hub, and a control unit according to the second aspect of the invention.

Thus, the wind turbine according to the third aspect may be controlled in accordance with a method according to the first aspect of the invention, and the remarks set forth above are therefore equally applicable here.

BRIEF DESCRIPTION OF THE DRAWINGS

The invention will now be described in further detail with reference to the accompanying drawings in which.

DETAILED DESCRIPTION OF THE DRAWINGS

Figure 1:
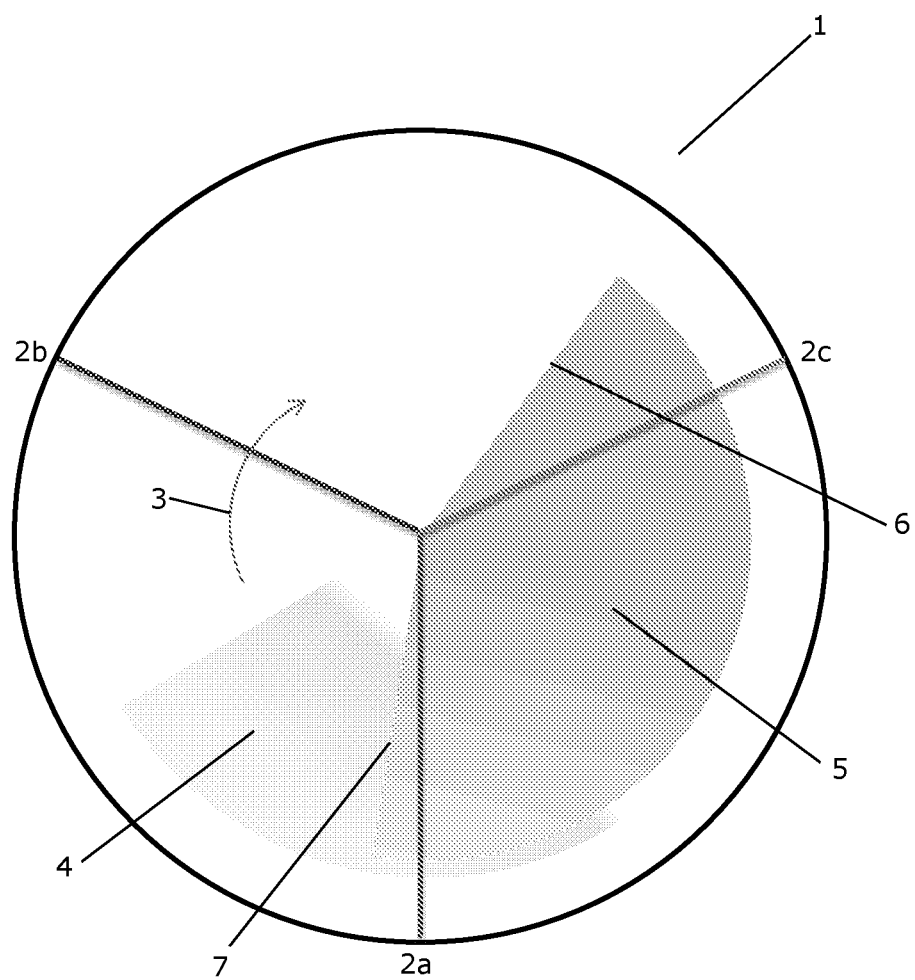
FIG. 1 is a schematic front view of a rotor of a wind turbine.

FIG. 1 is a schematic front view of a rotor 1 of a wind turbine, the rotor 1 comprising three wind turbine blades $2a$, $2b$, $2c$. The rotor 1 forms part of a wind turbine being controlled in accordance with a method according to an embodiment of the invention.

The wind turbine blades 2 perform azimuth rotations as indicated by arrow 3. When one of the wind turbine blades 2 is at an azimuth position within a measurement region 4, a blade flap moment on the wind turbine blade 2 is measured. It can be seen that the measurement region 4 includes an azimuth position which points directly downwards, and which therefore corresponds to the wind turbine blade 2 passing the tower of the wind turbine. It can also be seen that wind turbine blade $2a$ is within the measurement region 4, and that neither wind turbine blade $2b$, nor wind turbine blade $2c$ is within the measurement region 4. Thus, at the position of the rotor 1 shown in FIG. 1, the blade flap moment of wind turbine blade $2a$ is being measured, but the blade flap moments of wind turbine blades $2b$ and $2c$ are not being measured.

Based on the measured blade flap moment, a blade flap moment and a rotor tilt moment in a situation where a pitch offset is has not been added to the pitch angle of the wind turbine blades 2, are estimated. The estimated blade flap moment is compared to a first activation threshold value and the estimated rotor tilt moment is compared to a second activation threshold value.

In the case that the estimated blade flap moment exceeds the first activation threshold value and the estimated rotor tilt moment exceeds the second activation threshold value, it can be concluded that there is a risk of collisions between the wind turbine blades 2 and the tower, and in order to avoid this, individual pitch angle adjustment of the wind turbine blades 2 is initiated. This is done in the following manner.

When a wind turbine blade 2 enters an adjustment region 5 at azimuth position 6, a pitch offset is added to the pitch angle of that wind turbine blade 2, and the pitch offset is maintained until the wind turbine blade 2 leaves the adjustment region 5 at azimuth angle 7. The pitch offset may be applied in accordance with an appropriate pitch adjustment curve, such as a sigmoid curve.

Thus, the pitch angle of wind turbine blades 2 at azimuth positions within the adjustment region 5 is increased by the pitch offset, i.e. the wind turbine blade 2 is pitched slightly out of the wind. Thereby the aerodynamic forces acting on the wind turbine blade 2 are changed in such a manner that the blade deflection is decreased sufficiently to prevent collision between the wind turbine blade 2 and the tower, during tower passage.

It can be seen that wind turbine blade 2c has recently entered the adjustment region 5, that wind turbine blade 2a is about to leave the adjustment region 5, and that wind turbine blade 2b is outside the adjustment region 5.

It can further be seen that the adjustment region 5 is asymmetrical with respect to an azimuth position pointing directly downwards, in the sense that the azimuth position 6 where the wind turbine blades 2 enter the adjustment region 5 is well before the azimuth position pointing directly downwards, and the azimuth position 7 where the wind turbine blades 2 leave the adjustment region 5 is immediately after the azimuth position pointing directly downwards. This is due to the fact that there is a delay from a change in pitch angle is carried out and until the changed pitch angle results in a change in blade deflection. Therefore, by applying an asymmetrical adjustment region 5, as illustrated in FIG. 1, it is ensured that the desired change in blade deflection is fully effective when the wind turbine blade 2 passes the tower.

Figure 2:
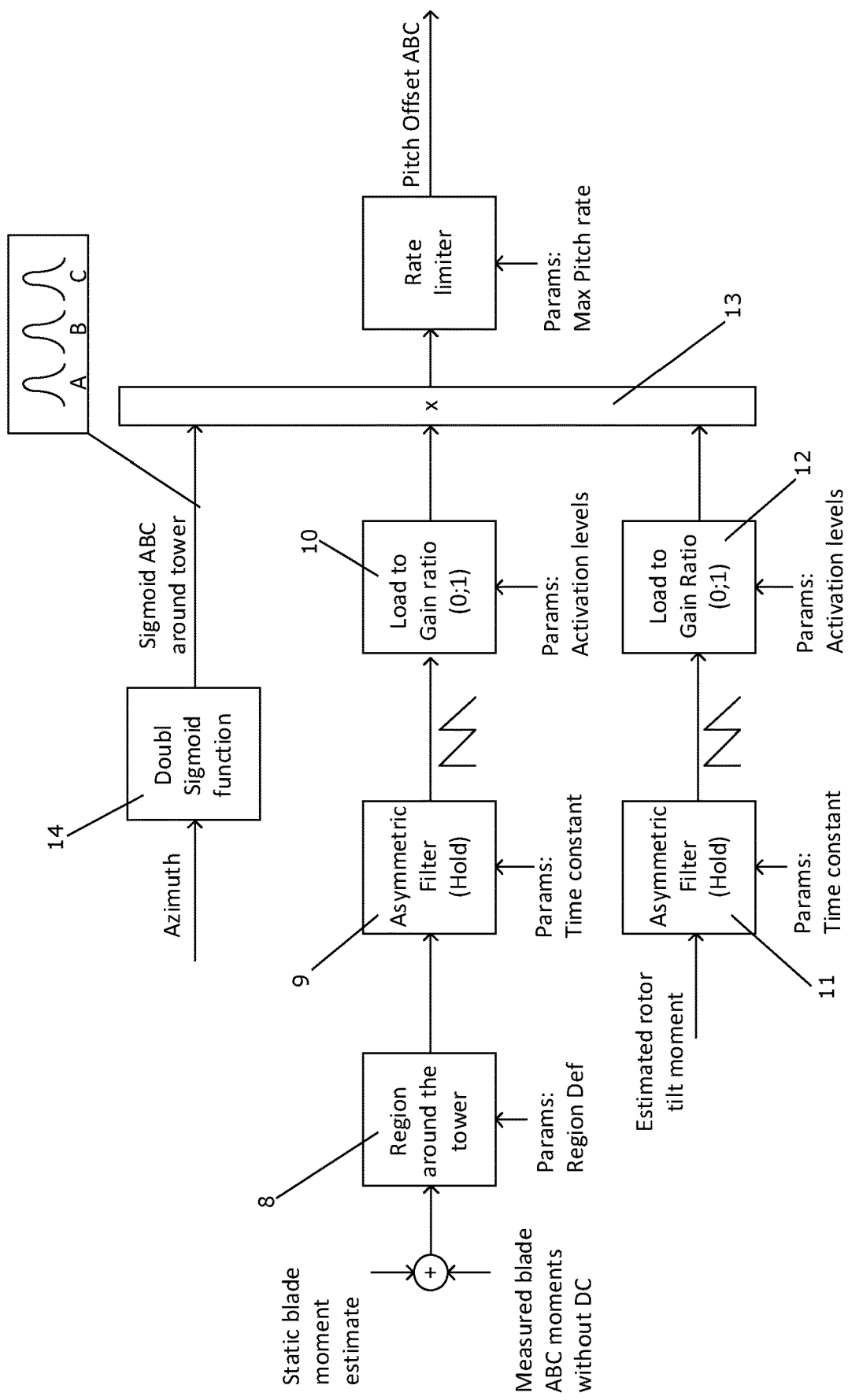
FIG. 2 is a diagram illustrating a method according to an embodiment of the invention.

FIG. 2 is a diagram illustrating a method according to an embodiment of the invention.

A static blade flap moment is modelled and supplied to a first analysis unit 8 along with a measured blade flap moment which had been obtained from measurements at the wind turbine blades. Based thereon, the first analysis unit 8 determines which part of the measured signal originates from wind turbine blades at azimuth positions within a measurement region including tower passage. The first analysis unit 8 further estimates a blade flap moment of the wind turbine blades in a situation where a pitch offset has not been added to the common or collective pitch angle of the wind turbine blades.

An asymmetric filter 9 is applied to the estimated blade flap moment, in order to ensure a smooth transition when one wind turbine blade leaves the measurement region and another wind turbine blade enters the measurement region, to the extent that this is possible. Furthermore, a suitable gain 10 is applied to the resulting estimated blade flap moment.

The measured blade flap moment is also supplied to a second analysis unit (not shown), which estimates a rotor tilt moment in a situation where a pitch offset has not been added to the common or collective pitch angle of the wind turbine blades, based thereon. An asymmetric filter 11 and a gain 12 are applied, similarly to the situation described above.

At decision block 13, the estimated blade flap moment is compared to a first activation threshold value, and the estimated rotor tilt moment is compared to a second activation threshold value. In the case that the estimated blade flap moment exceeds the first activation threshold value and the estimated rotor tilt moment exceeds the second activation threshold value, then it may be concluded that there is a risk of collisions between the wind turbine blades and the tower if no additional measures are taken. Therefore, individual pitch angle adjustment of the wind turbine blades is initiated, in order to decrease blade deflection at tower passage, and thereby avoid collisions between the wind turbine blades and the tower.

The individual pitch angle adjustment is performed by adding a pitch offset to wind turbine blades at azimuth angles which are within an adjustment region. The adjustment region includes an azimuth position which corresponds to tower passage of the wind turbine blades, and it could, e.g., be the adjustment region illustrated in FIG. 1. The pitch offset is added in accordance with a double sigmoid curve 14.

The individual pitch angle adjustment described above results in a decrease in blade deflection at azimuth positions corresponding to tower passage, thereby preventing collisions between the wind turbine blades and the tower, while maintaining optimal power production at other azimuth positions. Furthermore, since the individual pitch angle adjustment is only initiated if this is required in order to avoid collisions between the wind turbine blades and the tower, the resulting wear on the pitch bearings is minimised.

Figure 3:
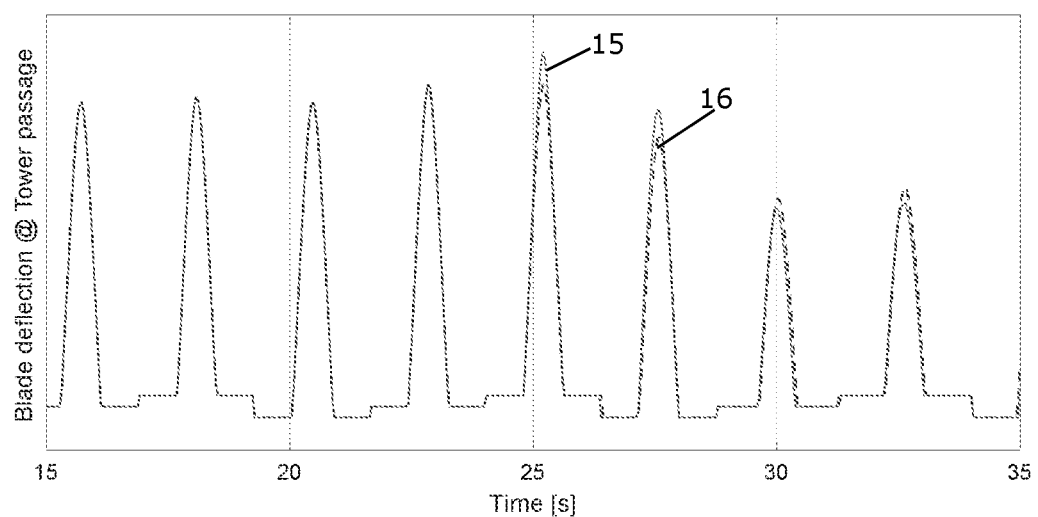
FIG. 3 is a graph illustrating blade deflection at tower passage when controlling a wind turbine according to a prior art method and in accordance with a method according to an embodiment of the invention.

FIG. 3 is a graph illustrating blade deflection at tower passage as a function of time. The solid curve 15 represents blade deflection without individual pitch angle adjustment, and the dashed curve 16 represents blade deflection with individual pitch angle adjustment, i.e. a method according to an embodiment of the invention.

It can be seen that until approximately t=24 s, the curves 15, 16 are coinciding. This is because the comparison between the estimated blade flap moment and the first activation threshold value and the comparison between the estimated rotor tilt moment and the second activation threshold value reveal that there is no risk of collisions between the wind turbine blades and the tower, and therefore individual pitch angle adjustment is not initiated.

After approximately t=24 s, it is established that the estimated blade flap moment exceeds the first activation threshold value and that the estimated rotor tilt moment exceeds the second activation threshold value. Therefore individual pitch angle adjustment of the wind turbine blades is initiated by adding a pitch offset at azimuth angles within an adjustment region, in order to prevent collusions between the wind turbine blades and the tower. It can be seen that this results in a decrease in the blade deflection.

Figure 4:
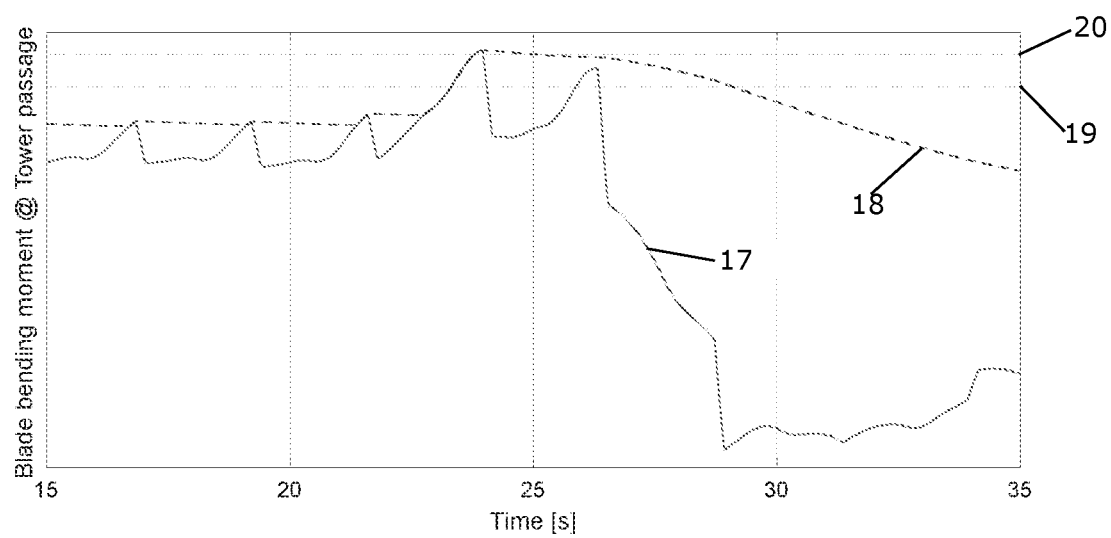
FIG. 4 is a graph illustrating estimated blade flap moment being estimated in accordance with a method according to an embodiment of the invention by applying an asymmetric filter.

FIG. 4 is a graph illustrating an estimated blade flap moment being estimated in accordance with a method according to an embodiment of the invention. The solid curve 17 represents a measured blade flap moment, and the dashed curve 18 represents an estimated blade flap moment, where an asymmetric filter is applied.

The measured blade flap moment 17 may be regarded as a sampled signal, where measurements are obtained from the wind turbine blade which is currently within the measurement region, as described above with reference to FIG. 1. Each time a wind turbine blade leaves the measurement region while another wind turbine blade enters the measurement region, a 'kink' and a steep decrease occurs in the measured blade flap moment 17. This can, e.g., be seen at approximately t=16.5 s, t=19 s, t=21.5 s, t=24 s and t=26 s.

When estimating the blade flap moment of the wind turbine blades in a situation where the pitch offset has not been added, based on the measured blade flap moment 17, an asymmetric filter is applied, thereby arriving at curve 18. The asymmetric filter is asymmetric in the sense that when the measured blade flap moment 17 is higher than the estimated blade flap moment 18, then the estimated blade flap moment 18 follows the measured blade flap moment, but when the measured blade flap moment 17 is lower than the estimated blade flap moment 18, then a low pass filter is applied to the measured blade flap moment 17 before the estimation is performed. This has the consequence that, when the measured blade flap moment 17 increases, e.g. due to a change in blade within the measurement region, then the estimated blade flap moment 18 follows this increase. However, when the measured blade flap moment 17 decreases fast, the estimated blade flap moment 18 decreases somewhat slower, thereby smoothening the 'kinks' in the estimated blade flap moment 18.

The estimated blade flap moment 18 is compared to a lower activation threshold value 19 and an upper activation threshold value 20. When the estimated blade flap moment 18 exceeds the lower activation threshold value 19, and provided that an estimated rotor tilt moment also exceeds a relevant activation threshold value, individual pitch angle adjustment of the wind turbine blades is initiated by adding a pitch offset in accordance with a gain function which is small when the estimated blade flap moment 18 is close to the lower activation threshold value 19, and increases towards 1 as the estimated blade flap moment 18 approaches the upper activation threshold value 20. When the estimated blade flap moment 18 exceeds the upper activation threshold value 20, the gain function is equal to 1.

It can be seen that the estimated blade flap moment 18 exceeds the lower activation threshold value 19 approximately at t=23 s and that the second activation threshold value 20 is exceeded approximately at t=24 s. It can further be seen that the estimated blade flap moment 18 decreases below the second activation threshold value 20 approximately at t=24.5 s, and decreases below the first activation threshold value 19 approximately at t=29 s. Accordingly, individual pitch angle adjustment is active from approximately t=23 s to approximately t=29 s, and from approximately t=24 s to approximately t=24.5 s, the gain is 1.

Figure 5:
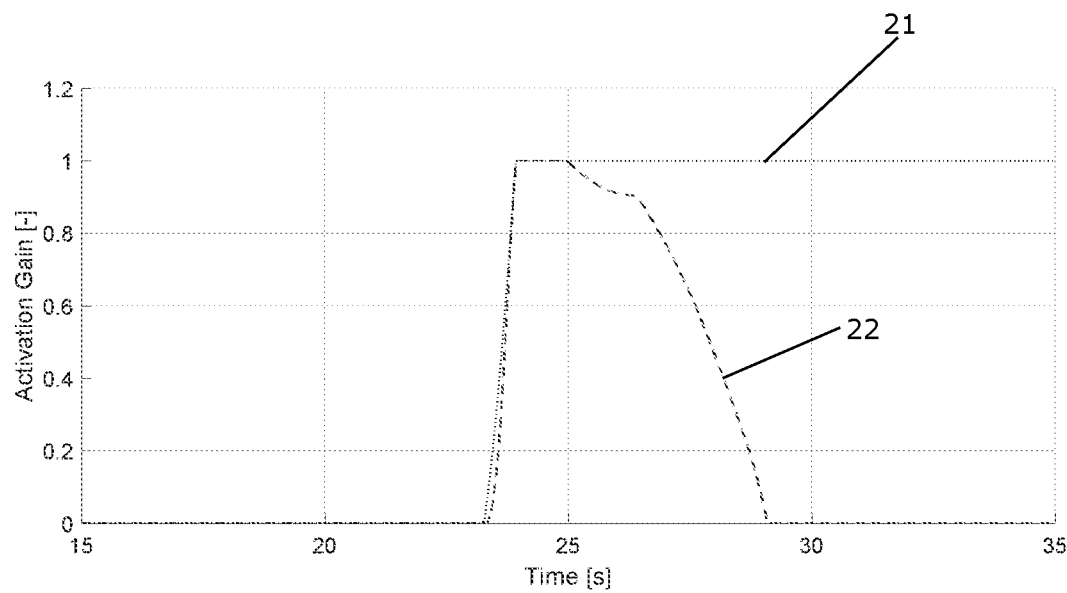
FIG. 5 is a graph illustrating activation gain for use in a method according to an embodiment of the invention.

FIG. 5 is a graph illustrating activation gain for use in a method according to an embodiment of the invention. The dotted curve 21 represents a gain function related to an estimated rotor tilt moment, and the dashed curve 22 represents a gain function related to an estimated blade flap moment, and corresponds to the situation illustrated in FIG. 4.

A resulting gain function for the individual pitch angle adjustment is obtained as a multiplication of the curves 21 and 22 of FIG. 5.

Figure 6:
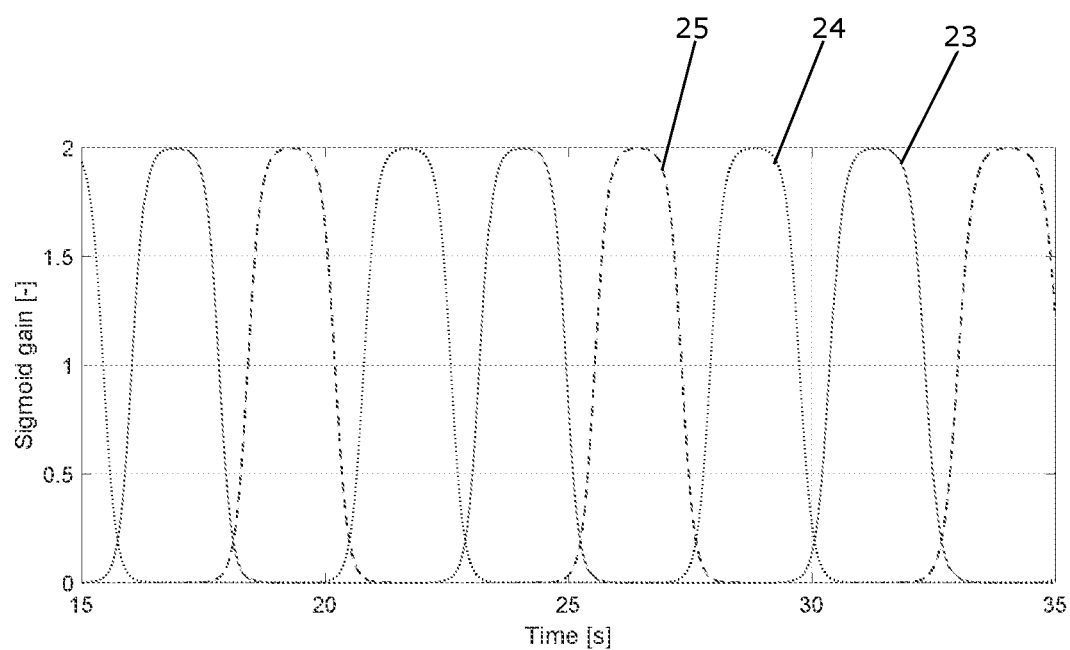
FIG. 6 is a graph illustrating sigmoid functions for a pitch offset for three wind turbine blades for use in a method according to an embodiment of the invention.

FIG. 6 is a graph illustrating sigmoid functions for a pitch offset as a function of time for three wind turbine blades for use in a method according to an embodiment of the invention. The solid 23, dotted 24 and dashed 25 curves each represents one of the wind turbine blades. The sigmoid functions are only present when a given wind turbine blade is within an adjustment region, as described above with reference to FIG. 1.

Figure 7:
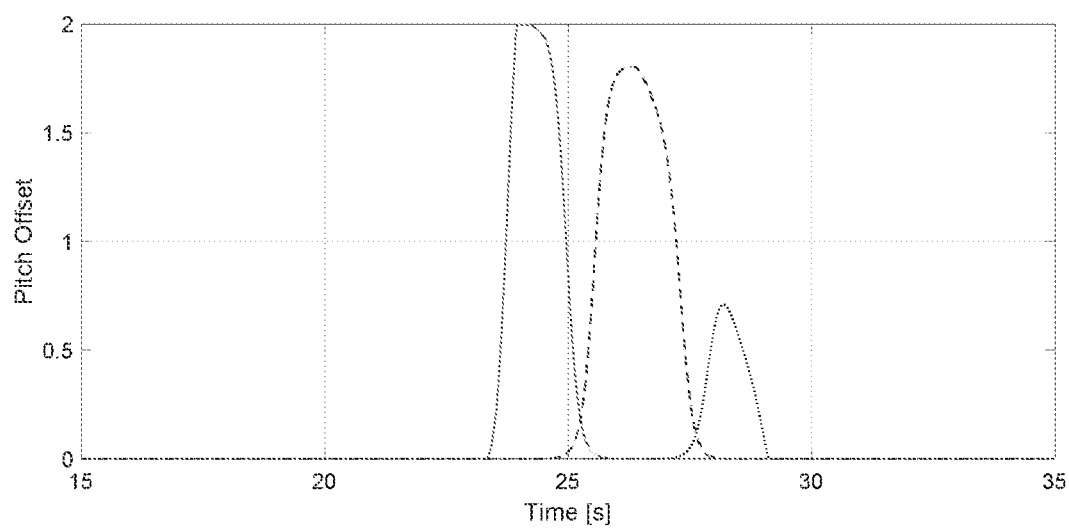
FIG. 7 is a graph illustrating pitch offset for three wind turbine blades of a wind turbine being controlled in accordance with a method according to an embodiment of the invention, and in accordance with the activation gain of FIG. 5 and the sigmoid functions of FIG. 6.

FIG. 7 is a graph illustrating pitch offset for three wind turbine blades of a wind turbine being controlled in accordance with a method according to an embodiment of the invention. The pitch offsets of FIG. 7 are obtained by multiplying the sigmoid functions of FIG. 6 with the gain function obtained from FIG. 5. It can be seen that the pitch offsets are only activated when the resulting gain function is non-zero. It can also be seen that the size of the pitch offset is determined by the value of the resulting gain function.

The invention claimed is:

1. A method for controlling a wind turbine to decrease blade deflection during tower passage, the blade deflection being decreased by adding a pitch offset at azimuth angles within an adjustment region, the wind turbine comprising a tower, a nacelle mounted rotatably on the tower, and one or more pitchable wind turbine blades mounted rotatably on the nacelle via a hub, the wind turbine blades thereby performing azimuth rotations relative to the nacelle, along with the hub, the method comprising:
   measuring a blade flap moment of the wind turbine blades, at least at azimuth angles corresponding to tower passage of the wind turbine blades,
   estimating a blade flap moment of the wind turbine blades in a situation where the pitch offset has not been added, based on the measured blade flap moment,
   estimating a rotor tilt moment in a situation where the pitch offset has not been added, based on the measured blade flap moment,
   comparing the estimated blade flap moment to a first activation threshold value, and comparing the estimated rotor tilt moment to a second activation threshold value,
   in the case that the estimated blade flap moment exceeds the first activation threshold value and the estimated rotor tilt moment exceeds the second activation threshold value, initiating individual pitch angle adjustment of the wind turbine blades by adding the pitch offset, at azimuth angles within an adjustment region, the adjustment region including an azimuth position corresponding to tower passage of the wind turbine blades.

2. The method according to claim 1, wherein the adjustment region is asymmetrical with respect to an azimuth position pointing directly downwards.

3. The method according to claim 2, wherein the adjustment region includes azimuth positions from 30° to 190° relative to an azimuth position pointing directly upwards.

4. The method according to claim 1, wherein estimating a blade flap moment of the wind turbine blades in a situation where the pitch offset has not been added comprises modelling a static blade flap moment.

5. The method according to claim 1, wherein initiating individual pitch angle adjustment of the wind turbine blades comprises increasing the pitch angle of wind turbine blades within the adjustment region in accordance with a predefined pitch adjustment curve.

6. The method according to claim 5, wherein the predefined pitch adjustment curve is a sigmoid curve.

7. The method according to claim 1, further comprising continuously measuring blade flap moment, estimating blade flap moment and rotor tilt moment, and comparing the estimated blade flap moment and the estimated rotor tilt moment to the first activation threshold value and the second activation threshold value, respectively, the method further comprising discontinuing individual pitch angle adjustment of the wind turbine blades in the case that the estimated blade flap moment decreases below the first activation threshold value and/or the estimated rotor tilt moment decreases below the second activation threshold value.

8. The method according to claim 1, further comprising high pass filtering the measured blade flap moment prior to estimating the blade flap moment and the rotor tilt moment.

9. The method according to claim 1, wherein estimating a blade flap moment and/or estimating a rotor tilt moment comprises applying an asymmetric filter to the measured blade flap moment.

10. A control unit for controlling blade deflection during tower passage in a wind turbine, the control unit comprising:
- van input for receiving a measured blade flap moment of wind turbine blades of the wind turbine,
- a blade flap moment estimating module being adapted to estimate a blade flap moment of the wind turbine blades in a situation where a pitch offset has not been added, based on the measured blade flap moment,
- a rotor tilt moment estimating module being adapted to estimate a rotor tilt moment in a situation where a pitch offset has not been added, based on the measured blade flap moment,
- a comparing unit being adapted to compare the estimated blade flap moment to a first activation threshold value, and to compare the estimated rotor tilt moment to a second activation threshold value, and
- a control output adapted to provide an activation signal for initiating individual pitch angle adjustment of the wind turbine blades by adding a pitch offset, at azimuth angles within an adjustment region, the adjustment region including an azimuth position corresponding to tower passage of the wind turbine blades, in the case that the estimated blade flap moment exceeds the first activation threshold value and the estimated rotor tilt moment exceeds the second activation threshold value.

11. A wind turbine, comprising:
- a tower;
- a nacelle mounted rotatably on the tower;
- one or more pitchable wind turbine blades mounted rotatably on the nacelle via a hub, the wind turbine blades thereby performing azimuth rotations relative to the nacelle, along with the hub; and
- a control unit for controlling blade deflection during tower passage, the control unit comprising:
  - an input for receiving a measured blade flap moment of wind turbine blades of the wind turbine;
  - a blade flap moment estimating module being adapted to estimate a blade flap moment of the wind turbine blades in a situation where a pitch offset has not been added, based on the measured blade flap moment;
  - a rotor tilt moment estimating module being adapted to estimate a rotor tilt moment in a situation where a pitch offset has not been added, based on the measured blade flap moment;
  - a comparing unit being adapted to compare the estimated blade flap moment to a first activation threshold value, and to compare the estimated rotor tilt moment to a second activation threshold value; and
  - a control output adapted to provide an activation signal for initiating individual pitch angle adjustment of the wind turbine blades by adding a pitch offset, at azimuth angles within an adjustment region, the adjustment region including an azimuth position corresponding to tower passage of the wind turbine blades, in the case that the estimated blade flap moment exceeds the first activation threshold value and the estimated rotor tilt moment exceeds the second activation threshold value.

12. A wind turbine according to claim 11, wherein the adjustment region is asymmetrical with respect to an azimuth position pointing directly downwards.

13. A wind turbine according to claim 12, wherein the adjustment region includes azimuth positions from 30° to 190° relative to an azimuth position pointing directly upwards.

14. A wind turbine according to claim 11, wherein estimating a blade flap moment of the wind turbine blades in a situation where the pitch offset has not been added comprises modelling a static blade flap moment.

\* \* \* \* \*